(12) United States Patent
Dupont et al.

(10) Patent No.: US 7,520,195 B2
(45) Date of Patent: Apr. 21, 2009

(54) CONTROL DEVICE FOR A MODULE FORMING A LOCK MECHANISM

(75) Inventors: Patrick Dupont, Noyelles sur Mer (FR); Jerry Godard, Abbeville (FR)

(73) Assignee: Valeo Securite Habitacle, Creteil (FR)

( * ) Notice: Subject to any disclaimer, the term of this patent is extended or adjusted under 35 U.S.C. 154(b) by 45 days.

(21) Appl. No.: 10/523,584

(22) PCT Filed: Aug. 6, 2003

(86) PCT No.: PCT/EP03/50363

§ 371 (c)(1), (2), (4) Date: Feb. 4, 2005

(87) PCT Pub. No.: WO2004/016957

PCT Pub. Date: Feb. 26, 2004

(65) Prior Publication Data

US 2006/0055176 A1    Mar. 16, 2006

(30) Foreign Application Priority Data

Aug. 9, 2002    (FR) .................................. 02 10149

(51) Int. Cl.
*F16C 1/10* (2006.01)
*F16C 1/26* (2006.01)

(52) U.S. Cl. ..................... 74/502.4; 74/502.6; 439/322; 439/682

(58) Field of Classification Search ..... 74/502.4–502.6; 174/665; 403/269; 439/682, 322; 16/87 R; *F16C 1/26*
See application file for complete search history.

(56) References Cited

U.S. PATENT DOCUMENTS

| 2,498,589 | A | * | 2/1950 | Steinke | ........................ 439/322 |
| 3,395,591 | A | | 8/1968 | Shaeffer | |
| 4,321,840 | A | * | 3/1982 | Kalamon | .................... 74/502.5 |
| 4,805,479 | A | | 2/1989 | Brightwell | |
| 6,179,669 | B1 | * | 1/2001 | Chiang | ........................ 439/682 |
| 6,540,427 | B2 | * | 4/2003 | Scheidling et al. | .......... 403/269 |
| 6,884,941 | B2 | * | 4/2005 | Birt | ............................. 174/665 |

(Continued)

FOREIGN PATENT DOCUMENTS

EP    000451411 A1 * 10/1991

(Continued)

OTHER PUBLICATIONS

Translation of FR 2 730 772, Michel, Aug. 23, 1996, PTO 08-1413.*

(Continued)

*Primary Examiner*—Vinh T. Luong
(74) *Attorney, Agent, or Firm*—Berenato, White & Stavish

(57) ABSTRACT

A Bowden-type cable containing a cable (14) is provided with proximal (14P) and distal extremities arranged in a jacket (18) having proximal (18P) and distal extremities blocked by proximal (20P) and distal arresting units. At least the first extremity (18P) of the jacket (18) is connected to the first arresting unit (20P) with the aid of a liaison unit (22) which is arranged on the first extremity (18P) of the jacket (18). In a preferred embodiment, the liaison unit is moulded on the first extremity (18P) of the jacket (18) and welded by ultrasound to the first arresting unit (20).

10 Claims, 3 Drawing Sheets

U.S. PATENT DOCUMENTS

2008/0229547 A1 * 9/2008 Michel ..................... 16/87 R

FOREIGN PATENT DOCUMENTS

| EP | 001074752 A1 | * | 2/2001 |
|----|---|---|---|
| FR | 2 526 506 | | 11/1983 |
| FR | 2 730 772 | | 8/1996 |
| FR | 2 763 983 | | 12/1998 |
| JP | 56-70119 | * | 6/1981 |
| JP | 59-34017 | | 2/1984 |
| WO | WO 99/10660 | * | 3/1999 |

OTHER PUBLICATIONS

Webster's II New Riverside University Dictionary, 1994, p. 513.*

* cited by examiner

CONTROL DEVICE FOR A MODULE FORMING A LOCK MECHANISM

BACKGROUND OF THE INVENTION

1. Field of the Invention

The present invention relates to an improved control device for a module forming a lock mechanism.

2. Description of the Related Art

The prior art already discloses a control device for a module forming a lock mechanism, of the type comprising a Bowden-type cable containing a cable having two ends, a proximal end and a distal end respectively, this cable being housed in a jacket having two ends, a proximal end and a distal end respectively, which are immobilized by two proximal and distal retaining elements.

This type of control device is used particularly for controlling a lock for the opening leaf of a motor vehicle, particularly for the side door of the vehicle.

The proximal end of the cable is connected to a control lever, also known as a paddle handle, pivot-mounted on the opening leaf so that it can be actuated from the inside of the vehicle. The distal end of the cable is connected to a control element for the module forming the lock mechanism. This module, provided with a latch, is arranged on the opening leaf so that, when the opening leaf is in the closed position, the latch engages with a striker borne by a corresponding frame.

When fitting the control device, it is particularly advisable to adjust the length of the proximal end of the cable protruding outside the jacket, through the proximal end of the latter, so as to allow for take-up of various functional play in the lock module and the control device. This adjustment makes it possible to achieve a desired travel for the control lever.

After carrying out the adjustment above, the proximal end of the jacket is immobilized with respect to the proximal retaining element. It is known practice to fasten the proximal end of the jacket to the proximal retaining element by an ultrasonic welding process.

However, the jacket is generally formed by a wire, particularly a metal wire, wound into a spiral with contiguous turns. This structure of the jacket does not always make it possible to obtain a quality ultrasonic weld providing the jacket with good pull-out resistance. In fact, the ultrasonic waves in some cases cause deformation of the spiral forming the jacket of the cable.

SUMMARY OF THE INVENTION

The object of the invention is to immobilize the end of a jacket on a corresponding retaining element with the aid of fastening means which provide effective resistance to pull-out and are well suited to a spiral structure of the jacket.

To this end, the subject of the invention is a control device for a module forming a lock mechanism, of the aforementioned type, characterized in that at least a first end of the jacket is connected to a corresponding first retaining element by means of a connecting element attached to the first end of the jacket.

The connecting element attached to the first end of the jacket makes it possible, when fastening this connecting element to the first retaining element, particularly by ultrasound, to prevent deformation of the spirally wound wire forming the jacket of the cable. The connecting element thus makes it possible to fasten the jacket to a retaining element in an efficient and resistant manner.

According to other optional characteristics of this control device:

the connecting element is overmolded on the first end of the jacket;

the connecting element is ultrasonically welded to the first retaining element;

the connecting element and the first retaining element comprise complementary welding faces each provided with fusible ribs, the ribs borne by the welding face of the connecting element being substantially perpendicular to the ribs borne by the welding face of the first retaining element;

the complementary welding faces are provided on complementary interlocking parts of the connecting element and the first retaining element;

the interlocking part of the first retaining element forms a longitudinal channel for the interlocking of the connecting element, the welding face of the first retaining element forming a base of the channel, the fusible ribs of the first retaining element preferably extending longitudinally;

the complementary interlocking parts of the connecting element and of the first retaining element comprise fusible complementary welding shoulders;

the first retaining element contains two fusible ribs extending longitudinally on either side of the jacket and two fusible welding shoulders extending longitudinally on either side of the jacket, the fusible ribs and the fusible welding shoulders of the first retaining element thus being offset laterally with respect to the jacket or, at the very least, with respect to the axis of this jacket;

the interlocking part of the first retaining element is extended by a shell provided with means for securing it to a fixed support;

the first end of the jacket is its proximal end;

the proximal end of the cable is provided with a block for securing this cable, the shell forming a housing for this securing block;

the jacket is formed by at least one wire, particularly a metal wire, wound into a spiral with contiguous turns;

the module forming a control mechanism is arranged in an opening leaf of a motor vehicle, particularly a side door of the vehicle.

BRIEF DESCRIPTION OF THE DRAWINGS

A better understanding of the invention will be gained from reading the description below, which is given purely by way of example and with reference to the drawings, in which.

DETAILED DESCRIPTION OF THE PREFERRED EMBODIMENTS

Figure 1:
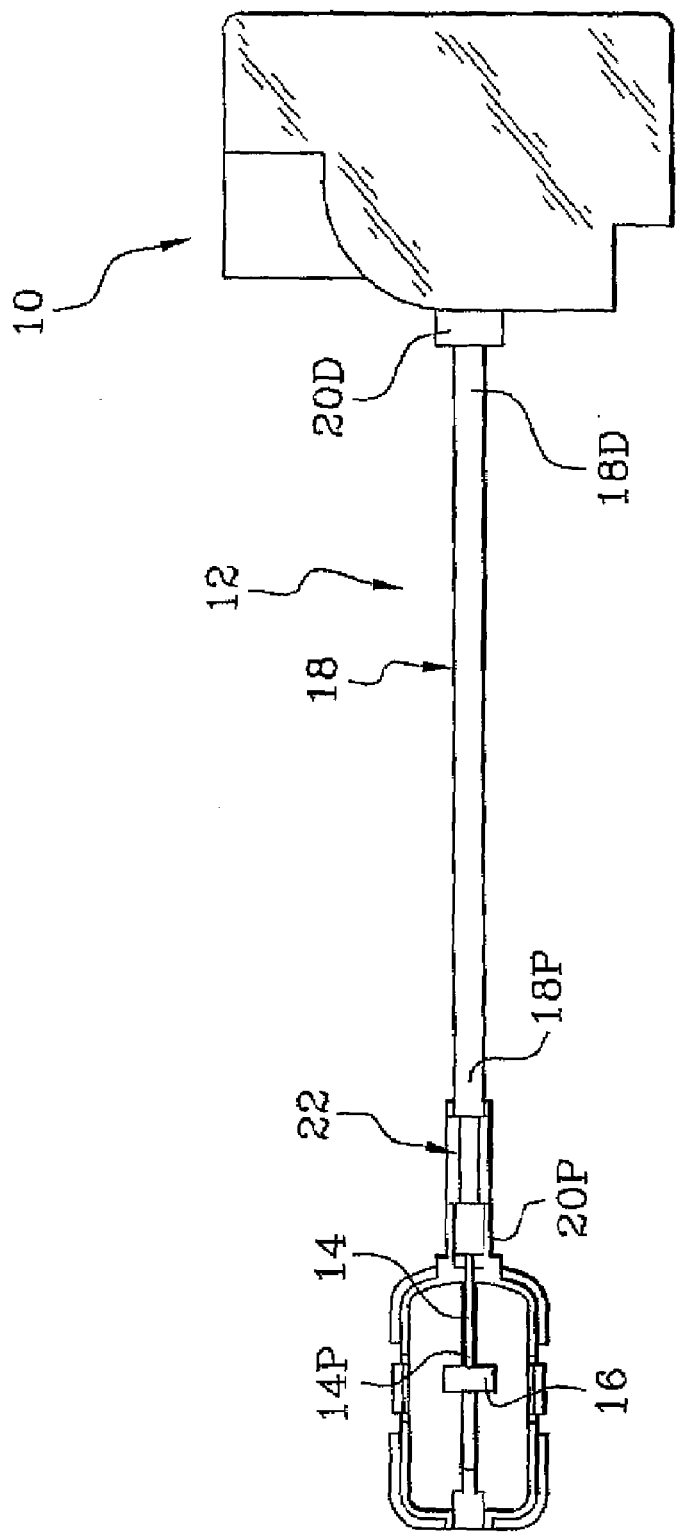
FIG. 1 is a general view of a module forming a lock mechanism, provided with a control device according to the invention.

FIG. 1 represents a module 10 forming a lock mechanism controlled by means of a device 12 according to the invention.

In the example described, the module 10 is arranged in an opening leaf of a motor vehicle, more specifically a side door of this vehicle.

The control device 12 is intended to connect a control element for the module 10 with a conventional control lever (not shown), also known as a paddle handle, pivot-mounted on the opening leaf so that it can be actuated from the inside of the vehicle.

In the text hereinbelow, with consideration to the kinematic linkage between the control lever and the module 10, on the one hand the term "proximal" will be used to qualify a component close to the control lever and remote from the module 10 and, on the other hand, the term "distal" will be used to qualify a component remote from the control lever and close to the module 10.

The control device 12 comprises a Bowden-type cable which, in the conventional way, contains a cable proper which is slidably mounted in a jacket.

Thus, this Bowden cable contains a cable 14 having two ends, a proximal end and a distal end respectively. The figures show only the proximal end 14P of the cable. As is conventional, the proximal end 14P of the cable is provided with a block 16 for securing this cable to an element linked kinematically to the control lever. This block 16 is usually made of a metal alloy commonly designated by the name "ZAMAK" which relates to a family of zinc alloys, the primary components of which are zinc, aluminum, magnesium and copper.

The cable 14 is housed in a jacket 18 having two ends, a proximal end 18P and a distal end 18D respectively. The jacket 18 is formed by at least one wire, preferably a metal wire, wound into a spiral with contiguous turns.

The distal end 18D of the jacket is immobilized by fastening in a manner known per se in a distal retaining element 20D borne by the module 10.

Figure 2:
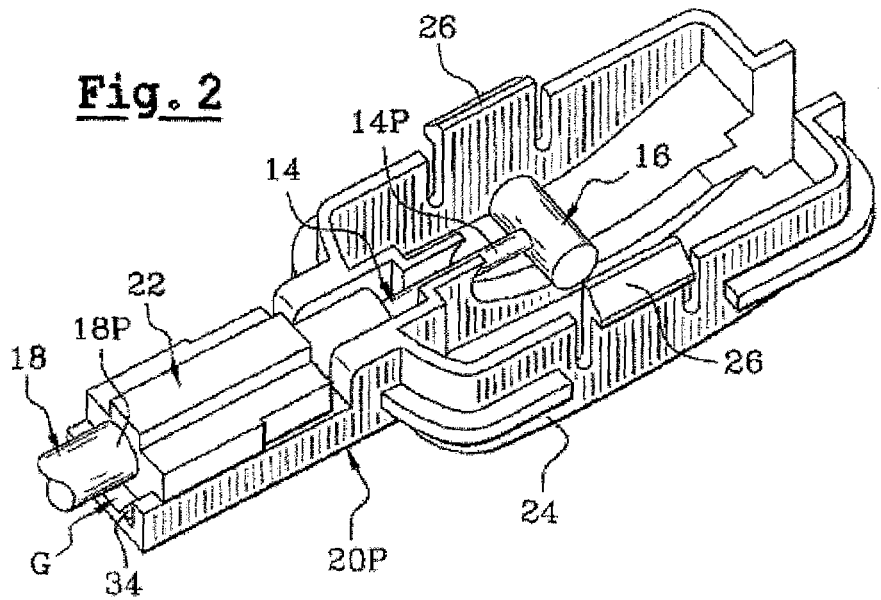
FIGS. 2 and 3 are perspective views of the connecting element and the first retaining element, the connecting element being represented after and before being fastened to the first retaining element, respectively.
Figure 3:
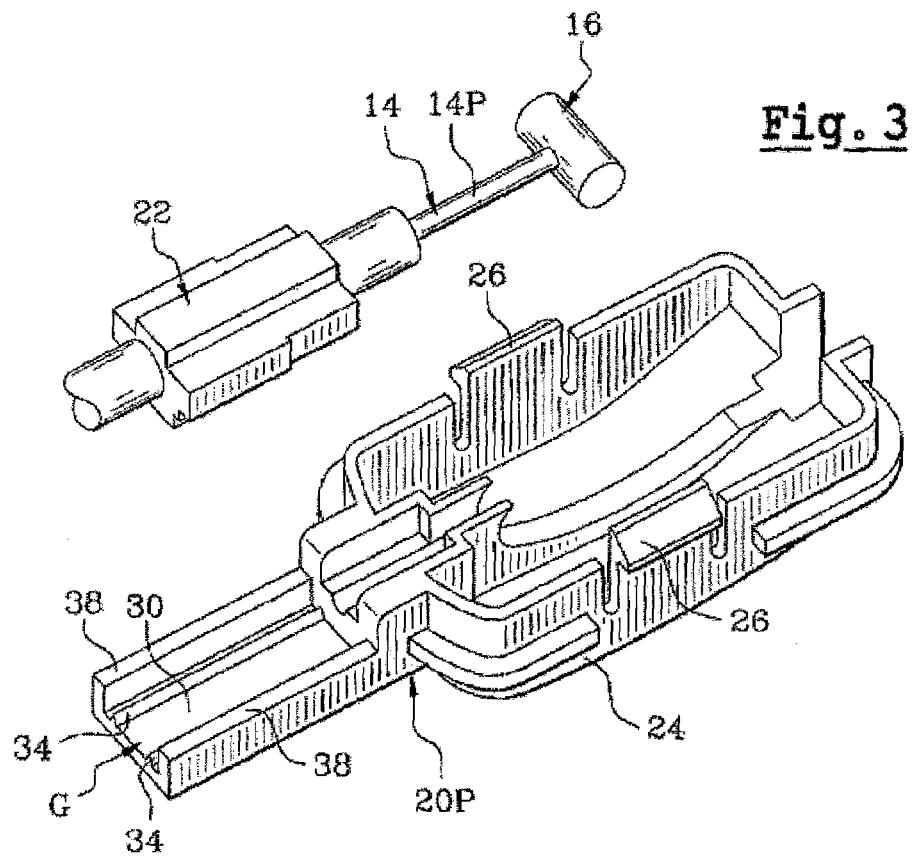

The proximal end 18P of the jacket is immobilized by fastening in a proximal retaining element 20P, which is represented in more detail in FIGS. 2 and 3.

According to the invention, at least one of the ends 18P, 18D of the jacket, namely the proximal end 18P in the example described, is connected to one of the corresponding retaining elements 20P, 20D, namely the proximal retaining element 20P in the example described, by means of a connecting element 22 connected to the proximal end 18P of the jacket.

The connecting element 22 is preferably overmolded on the proximal end 18P of the jacket and ultrasonically welded to the proximal retaining element 20P.

The connecting element 22 and the proximal retaining element 20P contain complementary interlocking parts. The interlocking part of the proximal retaining element 20P forms a longitudinal channel G for the interlocking of the complementary part of the connecting element 22 (see in particular FIG. 3). The channel G extends substantially parallel to the axial direction of the proximal end 18P of the jacket.

The interlocking part of the proximal retaining element 20P is extended by a shell 24 provided with conventional means for securing it to a fixed support (not shown) attached to the opening leaf. These securing means comprise two snap-locking tabs 26, for example.

It will be noted that the shell 24 forms a housing for the securing block 16.

Complementary welding faces 28, 30 are provided on the complementary interlocking parts of the connecting element 22 and the proximal retaining element 20P. The welding face 30 of the proximal retaining element 20P forms a base of the channel G.

Figure 4:
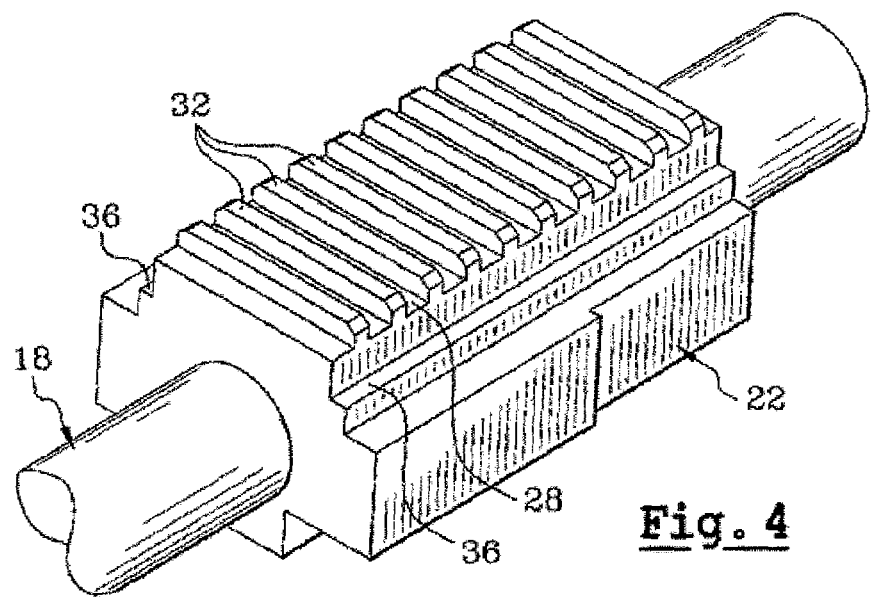
FIG. 4 is a perspective view of the connecting element in a position in which it has been turned over with respect to the position represented in FIGS. 2 and 3.

As can be seen more particularly in FIG. 4, the welding face 28 of the connecting element 22 is provided with fusible ribs 32, these being substantially parallel to one another and perpendicular to the longitudinal direction of the channel G.

Figure 5:
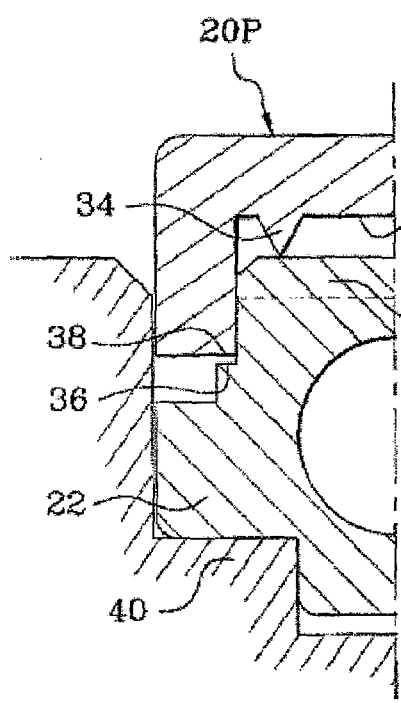
FIGS. 5 and 6 are cross-sectional half-views of the connecting element and the first retaining element, the connecting element being represented before and after being fastened to the first retaining element, respectively.

Furthermore, as can be seen more particularly in FIGS. 3 and 5, the welding face 30 of the proximal retaining element 20P is provided with fusible ribs 34, being two in number in the example described, which are substantially parallel to the longitudinal direction of the channel G and are arranged near the lateral edges of this channel.

The ribs 32 borne by the welding face 28 of the connecting element 22 are therefore substantially perpendicular to the ribs 34 borne by the welding face 30 of the proximal retaining element 20P.

The complementary interlocking parts of the connecting element 22 and the proximal retaining element 20P comprise two pairs of fusible complementary welding shoulders 36, 38. These fusible shoulders 36, 38 extend, after welding, substantially parallel to the longitudinal direction of the channel G. The two fusible shoulders 38 of the proximal retaining element 20P delimit the upper edges of the channel G.

The proximal retaining element 20P therefore contains two fusible ribs 34 extending longitudinally on either side of the jacket 18, more specifically on either side of the proximal end 18P thereof, and two fusible welding shoulders 38 extending longitudinally on either side of the jacket 18. Consequently, the fusible ribs 34 and the fusible welding shoulders 38 of the proximal retaining element 20P are offset laterally with respect to the jacket 18 or, at the very least, with respect to the axis of this jacket 18.

This specific arrangement of the ribs 34 and the shoulders 38 (and therefore the complementary shoulders 36) has the advantage that the weld is not produced in the axis of the jacket 18. This makes it possible to prevent the weld being weakened as a result of deterioration of wave propagation by the jacket 18. Furthermore, a lining, or liner, is generally housed within the jacket 18. The above arrangement of the fusible ribs and shoulders prevents undesirable bonding of the lining to the cable 14, which would lead to malfunctions of the Bowden cable.

Fastening the proximal end 18P of the jacket to the proximal retaining element 20P can be achieved simply.

First of all, the length of the proximal end 14P of the cable protruding outside the jacket 18, through the proximal end 18P thereof, is adjusted in a manner known per se so as to take up various functional play in the module 10 and the control device 12.

The connecting element 22, having been overmolded on the jacket 18 beforehand, is then fastened to the proximal retaining element 20P by ultrasonic welding.

To perform the welding operation, the connecting element 22 and the proximal retaining element 20P are first of all arranged in a conventional prepositioning die 40, as is represented in FIG. 5.

Figure 6:
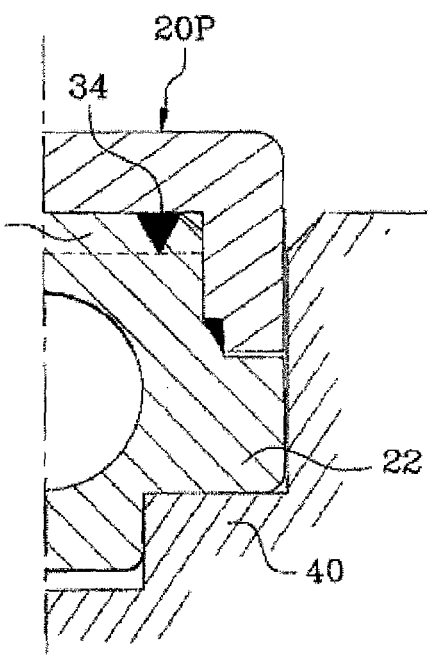

Next, the connecting element 22 and the proximal retaining element 20P are subjected in a manner known per se to ultrasonic welding waves which, on the one hand, lead to a weld fusion of the fusible complementary ribs 32, 34 and, on the other hand, to a weld fusion of the fusible complementary shoulders 36, 38, this taking place in the regions of contact between these complementary ribs 32, 34 and between these complementary shoulders 36, 38 (see FIG. 6).

Because the ultrasonic waves are not directly transmitted to the jacket 18 but to the connecting element 22 attached to this jacket, they do not deform the spiral structure of the jacket 18.

It will be noted that the fusible ribs 32, 34, which are substantially perpendicular to one another, provide a very strong fastening of the connecting element 22 with the proximal retaining element 20P.

The invention claimed is:

1. A control device for a module (10) forming a lock mechanism, the control device comprising:
    a cable (14) having a proximal end (14P) and a distal end respectively;
    a jacket (18) housing the cable; the jacket having a proximal end (18P) and a distal end (18D) respectively, the proximal and distal ends of the jacket are immobilized by proximal (20P) and distal (20D) retaining elements,
    wherein at least the proximal end (18P) of the jacket (18) is connected to the proximal retaining element (20P) by means of a connecting element (22) attached to the proximal end (18P) of the jacket (18), and
    wherein a fusion interface is provided between the connecting element (22) and the proximal retaining element (20P) at locations offset laterally from an axis of the jacket (18) to avoid deformation of the jacket (18) during a welding process.

2. The device as claimed in claim 1, wherein the connecting element (22) is overmolded on the proximal end (18P) of the jacket (18).

3. The device as claimed in claim 1, wherein the fusion interface between the connecting element (22) and the proximal retaining element (20P) is formed by ultrasonically welding the connecting element (22) to the proximal retaining element (20P).

4. The device as claimed in claim 3, wherein the connecting element (22) and the proximal retaining element (20P) comprise complementary welding faces (28, 30) each provided with ribs (32, 34), the ribs (32) borne by the welding face (28) of the connecting element (22) being substantially perpendicular to the ribs (34) borne by the welding face (30) of the proximal retaining element (20P), and wherein the fusion interface is formed between the ribs (32, 34) of the complementary welding faces (28, 30).

5. The device as claimed in claim 4, wherein the complementary welding faces (28, 30) are provided on complementary interlocking parts of the connecting element (22) and the proximal retaining element (20P).

6. The device as claimed in claim 5, wherein the interlocking part of the proximal retaining element (20P) forms a longitudinal channel (G) for the interlocking of the connecting element (22), the welding face (30) of the proximal retaining element (20P) forming a base of the channel (G), the ribs (34) of the proximal retaining element (20P) extending longitudinally.

7. The device as claimed in claim 6, wherein the complementary interlocking parts of the connecting element (22) and of the proximal retaining element (20P) comprise complementary welding shoulders (36, 38), and wherein the fusion interface is formed between the complementary welding shoulders (36, 38).

8. The device as claimed in claim 7, wherein the proximal retaining element (20P) contains two ribs (34) extending longitudinally on either side of the jacket (18) and two welding shoulders (38) extending longitudinally on either side of the jacket (18) so that the ribs (34) and the welding shoulders (38) of the proximal retaining element (20P) are offset laterally with respect to the axis of the jacket (18).

9. The device as claimed in claim 5, wherein the proximal end (14P) of the cable (14) is provided with a block (16) for securing the cable (14), and wherein a shell (24) forms a housing for the securing block (16).

10. The device as claimed in claim 1, wherein the fusion interface is disposed within an enclosed space defined between the connecting element (22) and the proximal retaining element (20P).

* * * * *